United States Patent
Tuunanen

(10) Patent No.: US 9,739,136 B2
(45) Date of Patent: Aug. 22, 2017

(54) METHOD AND ARRANGEMENT FOR CALIBRATING SENSORS IN DRILLING EQUIPMENT

(75) Inventor: Ari Tuunanen, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 578 days.

(21) Appl. No.: 14/131,253

(22) PCT Filed: Jul. 6, 2012

(86) PCT No.: PCT/FI2012/050711
§ 371 (c)(1),
(2), (4) Date: Jan. 10, 2014

(87) PCT Pub. No.: WO2013/007879
PCT Pub. Date: Jan. 17, 2013

(65) Prior Publication Data
US 2014/0157860 A1 Jun. 12, 2014

(30) Foreign Application Priority Data
Jul. 8, 2011 (FI) .................................. 20115739

(51) Int. Cl.
| E02F 9/26 | (2006.01) |
| E21B 47/022 | (2012.01) |
| E21B 7/02 | (2006.01) |
| G01C 25/00 | (2006.01) |

(52) U.S. Cl.
CPC ............. *E21B 47/022* (2013.01); *E21B 7/02* (2013.01); *E21B 7/025* (2013.01); *G01C 25/00* (2013.01)

(58) Field of Classification Search
CPC ... G01C 9/20; G01C 9/28; E02F 3/433; E02F 9/264; E21B 47/02; E21B 47/022
USPC ........................................................... 73/1.75
See application file for complete search history.

(56) References Cited

U.S. PATENT DOCUMENTS

| 4,274,494 A | 6/1981 | Bergstroem |
| 4,542,794 A | 9/1985 | Bjor |
| 5,348,105 A | 9/1994 | Lappalainen et al. |
| 5,383,524 A | 1/1995 | Rinnemaa |
| 7,644,782 B1 | 1/2010 | Coogan et al. |
| 7,930,148 B1 | 4/2011 | Figaro et al. |

(Continued)

FOREIGN PATENT DOCUMENTS

| JP | 6-502000 A | 3/1994 |
| JP | 2001159518 A | 6/2001 |
| JP | 2008002842 A | 1/2008 |

(Continued)

*Primary Examiner* — David M Gray
*Assistant Examiner* — Andrew V Do
(74) *Attorney, Agent, or Firm* — Corinne R. Gorski

(57) ABSTRACT

A method for calibrating sensors in a drilling apparatus provided with a movable carrier, a frame, a boom assembly mounted to rotate about a turning axis vertical to the frame, and an angle sensor for measuring the turning angle of the boom assembly and gravity-based inclination sensors for measuring inclination. When the boom assembly is turned in relation to the frame, the value of the turning angle and the inclination values provided by the inclination sensors are measured, and on the basis of the measured values, deviation of the values of the inclination sensors from the real inclination angle value are determined.

6 Claims, 5 Drawing Sheets

(56) References Cited

U.S. PATENT DOCUMENTS

2010/0006337 A1    1/2010   Kosoric
2013/0158788 A1*   6/2013   Seki .................. E02F 9/264
                                                                  701/34.4

FOREIGN PATENT DOCUMENTS

JP         200838418 A    2/2008
WO       2008100201 A1   8/2008

* cited by examiner

METHOD AND ARRANGEMENT FOR CALIBRATING SENSORS IN DRILLING EQUIPMENT

RELATED APPLICATION DATA

This application is a §371 National Stage Application of PCT International Application No. PCT/FI2012/050711 filed Jul. 6, 2012 claiming priority of FI Application No. 20115739, filed Jul. 8, 2011.

BACKGROUND OF THE INVENTION

The invention relates to a method for calibrating sensors in drilling equipment provided with a movable carrier, a frame mounted to turn about a horizontal axis that is transverse to the direction of movement of the carrier, and an upper carriage mounted to the frame to turn about a vertical axis, and an angle sensor for measuring a turning angle of the upper carriage in relation to the frame and gravity-based sensors for measuring inclination of the upper carriage. The invention further relates to an arrangement for calibrating sensors in a drilling equipment provided with a movable carrier, a frame, a boom assembly mounted to turn about a turning axis vertical to the frame, an angle sensor for measuring a turning angle of the boom assembly in relation to the frame, and gravity-based inclination sensors mounted to the boom assembly and rotating with the assembly about the turning axis for measuring inclination in the direction of two co-ordinate axes that are perpendicular to each other.

Different kinds of measuring devices and/or sensors are used on movable drilling equipment for desired orientation and positioning of the drill rod and the drill hole formed with it. Such measuring devices are typically gravitation-based inclination sensors and sensors indicating movements of different movable parts. Typical examples include angle sensors of joints and distance or motion sensors indicating linear movement. Likewise, measuring devices indicating compass direction or those based on satellite navigation are used for measuring a compass direction and location of the drilling equipment in a global coordinate system.

A simple measuring device, such as one indicating drill rod inclination, may be calibrated in a simple manner by using only a few tools, such as a spirit level or a similar device, to turn the drill rod to a vertical position. In that case the display of the measuring device shows sensor errors. More complicated measuring devices are often provided with a plural number of sensors to measure a plural number of directions and angles, and therefore they are not very easy to calibrate.

Today devices are typically calibrated in a factory environment, where a sufficient number of different reference devices are available and different inclined planes, points with known locations and other necessary devices or means may be provided for the calibration. In that case, there are also persons available who are well versed in calibration and able to use the devices and means.

A problem with current calibration methods is lack of measuring devices or an environment unsuitable for calibration or the fact that the device to be calibrated must often be transported to the measuring site for calibration. This causes both loss of time and costs. Moreover, if for any reason there is need to check the calibration of the device, this cannot be done quickly on site, but a large amount of measuring devices and other equipment must be transported to the location. This may also cause measurement and calibration errors due to poor conditions.

BRIEF DESCRIPTION OF THE INVENTION

It is an object of the invention to provide a method and an arrangement that allows at least some sensors of drilling equipment to the calibrated easier and with fewer tools than today also in field conditions, or calibration to be performed without separate measuring devices.

The method of the invention is characterised by
moving the drilling equipment on a surface beneath it to a position where it stays in place steadily, without tilting, when the boom assembly is turned about the turning axis;
turning the boom assembly about the turning axis to a plural number of different turning angle positions in relation to the frame;
measuring a turning angle value and inclination values provided by the inclination sensors for each turning angle position; and
determining on the basis of the measured turning angle value and the inclination values provided by the inclination sensors deviations of the values provided by the inclination sensors from the actual inclination angle.

The arrangement of the invention characterized in that
the control unit is arranged, when turning the boom assembly about the turning axis to a plural number of different turning angle positions in relation to the frame, to
measure the value of the turning angle and the inclination values provided by the inclination sensors for each turning angle position; and
calculate, on the basis of the measured turning angle value and the inclination values provided by the inclination sensors, deviations of the values provided by the inclination sensors from the actual inclination angle.

In one embodiment of the arrangement the inclination sensors used in calibration are sensors mounted to the turning axis end of the boom assembly to measure the inclination of the frame, and they are mounted to the boom assembly so as to turn about the turning axis with the boom assembly when the boom assembly is turned, whereas otherwise they stay in the same position in relation to the turning axis irrespective of the boom assembly movements. In another embodiment of the arrangement the control unit is arranged to calculate the values of deviation of the inclination sensors by using the measured angle values and by applying the least squares method.

In another embodiment of the arrangement the control unit is arranged for calibrating, after the calibration of the inclination sensors, a turning sensor of the turning axis, the boom assembly being kept in the same position in relation to the drilling arrangement and non-turnable in place in relation to the drilling arrangement frame, to read the value of the turning angle of the turning sensor, when tilting the frame to different inclination angles in relation to the carrier about a transverse axis between them, to measure the inclination values of the inclination sensors of the inclination measuring device and to calculate on the basis of the measured values of the turning angle and the inclination angles the turning angle deviation provided by the turning sensor from the actual turning angle value.

In another embodiment of the arrangement the inclination sensors used in the calibration are sensors mounted to a feed beam provided at the end of the boom assembly to measure the inclination of the feed beam and when the boom assembly and the feed beam are kept in the same position in relation to one another throughout the calibration, the inclination sensors turn about the turning axis with the boom assembly as the boom assembly is turned, whereas otherwise they stay in the same position in relation to the turning axis.

In another embodiment of the arrangement the control unit is arranged to measure during calibration inclination values of inclination sensors mounted to the drilling equipment frame and remaining stationary with the frame during the turning of the boom assembly to measure the inclination of the frame, and to calculate by means of the inclination sensors of the feed beam deviations of the inclination sensors mounted to the frame to measure the inclination of the frame.

In another embodiment of the arrangement the control unit is arranged to calculate the values of deviation of the inclination sensors by using the measured angle values and by applying the least squares method.

The invention is based on an idea according to which the boom assembly is turned about its vertical turning axis to a plural number of different angle positions, the turning angle and the inclination values provided by the sensor indicating inclination being stored for each angle position. The method further comprises calculating deviations for the inclination values provided by the sensors from the actual inclination, i.e. zero offsets of the sensors, on the basis of the turning angle and the inclination values by means of trigonometric functions.

An advantage of the invention is that no separate measuring devices are needed for the calibration, but the calibration may be carried out using only the sensors provided in the drilling equipment and a program installed to a control device. This allows calibration to be carried out easily and rapidly also in the field, without having to move the equipment anywhere. In equipment provided with a cabin for the operator the calibration may be carried out without the operator having to leave the cabin.

BRIEF DESCRIPTION OF THE FIGURES

The invention is now described in greater detail in the attached drawings, in which.

DETAILED DESCRIPTION OF THE FIGURES

Figure 1:
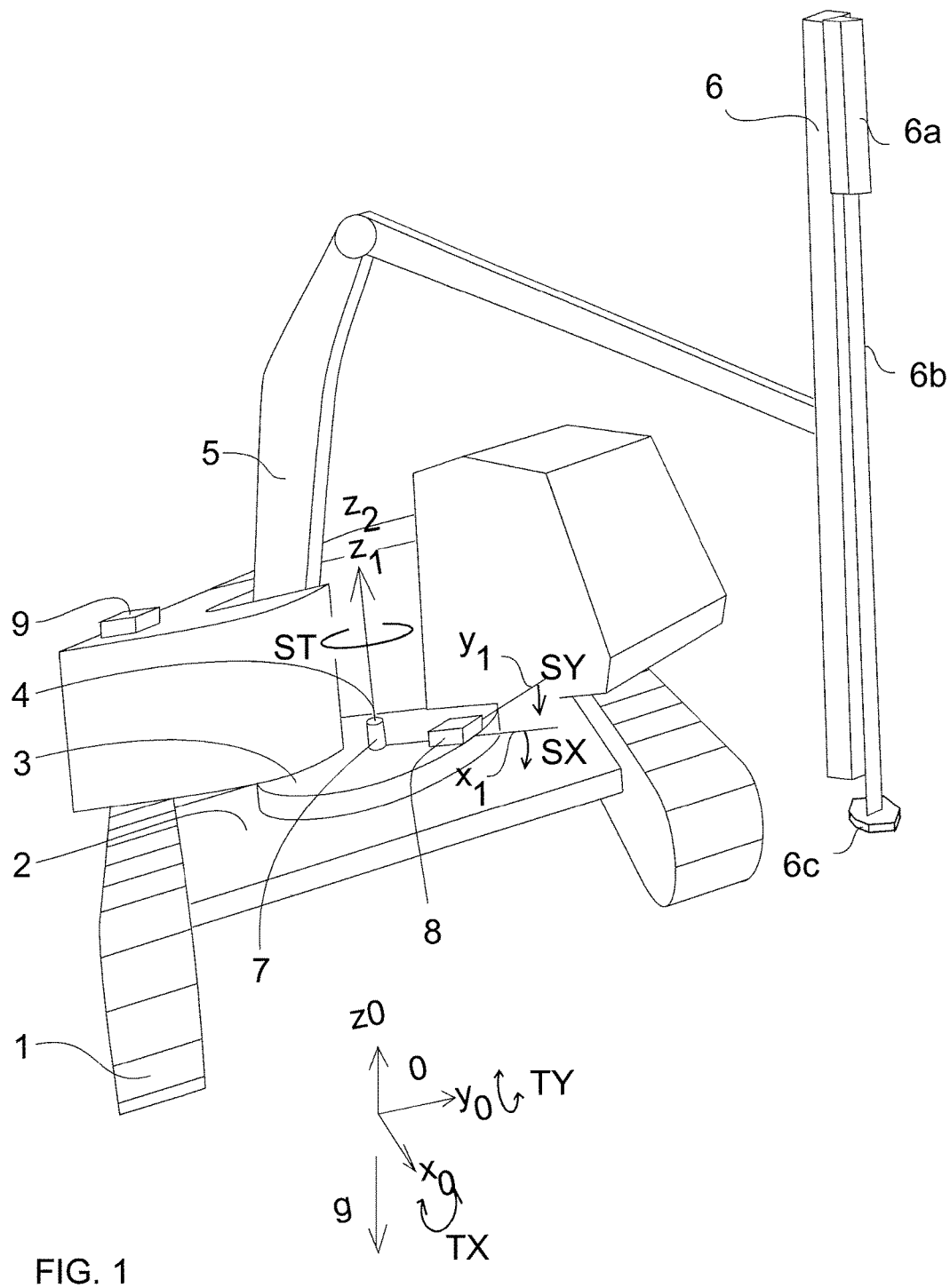
FIG. 1 is a schematic view of drilling equipment and the related co-ordinate system.
Figure 4A:
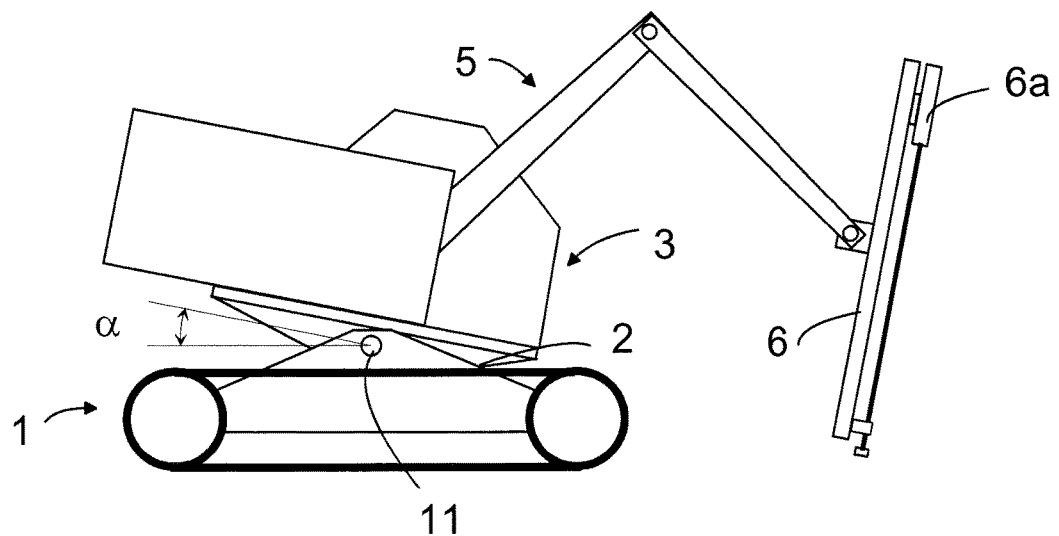
FIGS. 4a and 4b are schematic views of calibration of a turning sensor of the boom assembly.
Figure 4B:
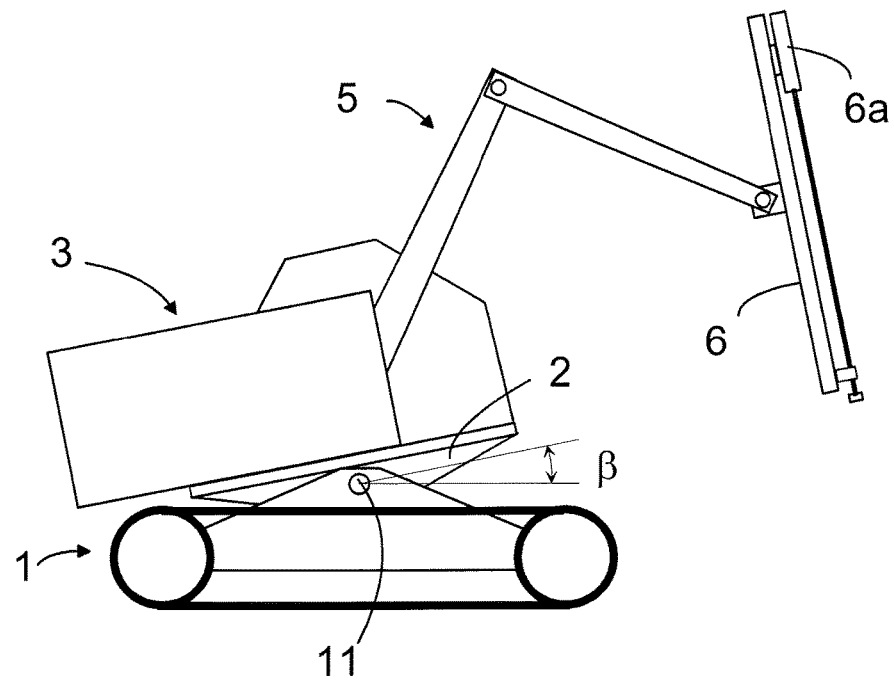

FIG. 1 shows drilling equipment provided with a movable carrier 1 comprising rolls for moving and moved by an engine of the equipment not shown, a frame 2 being attached to the carrier so as to rotate about a transverse axis in a manner to be disclosed in a greater detail with reference to FIGS. 4a and 4b. Further, the drilling equipment is provided with an exemplary upper carriage 3 that turns about a turning axis 4 vertical to the frame 2. The vertical turning axis 4 refers to an axis which is vertical in Earth coordinate system when the frame 2 is horizontal. When the frame tilts to any direction, the turning axis 4 naturally tilts to the same direction by an equal amount.

The upper carriage 3 is further provided with a boom assembly 5 attached thereto by joints, a feed beam 6 for a drilling machine 6a being provided at an end of the boom assembly. Further, there is a drill rod 6b and a drill bit 6c. The turning of the upper carriage 3 and thus the boom assembly 5 in relation to the frame 2 is measured by an angle sensor 7 and the inclination of the upper carriage in a direction of mutually perpendicular coordinate axes SX and SY fixed in relation to the upper carriage 3 is measured by inclination sensors of an inclination measurement device 8 attached to the upper carriage 3. The inclination sensors of the inclination measurement device 8 generally work on the basis of gravity. The drilling equipment is further provided with a computing unit 9 computing the inclination of the upper carriage on the basis of the inclination values submitted by the inclination sensors of the inclination measurement device 8.

FIG. 1 further shows a coordinate set x1, y1 and z1 of the carrier, x1 representing the direction of travel of the drilling equipment, i.e. straight ahead, and a coordinate set x0, y0 and z0 determined by the Earth's gravity.

The inclination sensors of the inclination measurement device 8 measuring the inclination of the upper carriage 3 are calibrated in the following manner. The drilling equipment is moved to a suitable surface where it stays in place steadily, without tilting, when the upper carriage 3 and the boom assembly 5 attached thereto and the devices attached to the boom assembly are turned about the turning axis 4. Likewise, the frame 2 and the upper carriage 3 remain all the time in the same position in relation to the carrier 1. The drilling equipment carrier does not have to be horizontal, nor does its inclination need to be known, provided that the frame 2 of the drilling equipment stays in the same position, without tilting, during the calibration.

Figure 2A:
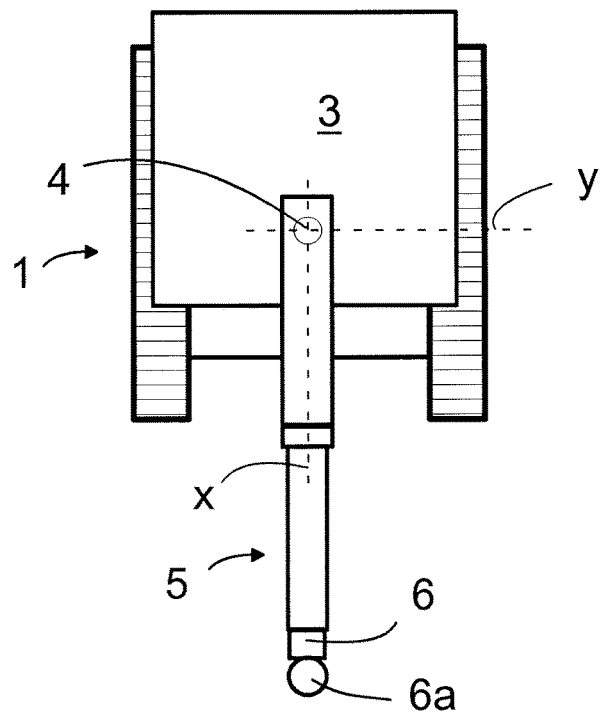
FIGS. 2a and 2b are schematic views of calibration of inclination sensors provided in the drilling equipment, carried out by the method of the invention by turning the boom assembly.
Figure 2B:
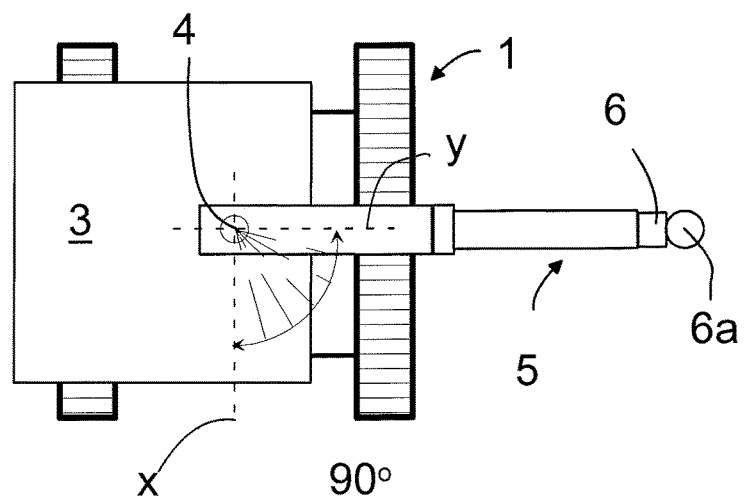

The upper carriage 3 of the drilling equipment is turned in the manner shown in FIGS. 2a and 2b about the turning axis 4 to different turning positions 1, and in each turning position i a turning angle ST provided by the angle sensor 7 and inclination values for the upper carriage in the direction of axes SX and SY, provided by the inclination sensors of the inclination measurement device 8, are recorded. The upper carriage 3 is preferably turned by an angle of a sufficient size, for example 90°, the inclination sensors of the inclination measurement device 8 thus being at a turning angle of 90°, as shown in FIG. 2b. Naturally, the turning angle may be smaller or greater than 90°, because there is a mathematical correlation between the sensor measurement values, and thus errors caused by the installation of the sensors, i.e. so-called offset values, may be calculated in the following manner.

$$TY = a \sin(-\sin(SX)\cos(ST) + \sin(SY)\sin(ST)) \qquad (1)$$

$$TX = a \sin((\sin(SY)\cos(ST) + \sin(SX)\sin(ST))/\cos(TY)), \qquad (2)$$

where

TY represents longitudinal inclination of the carrier, its turning about axis $y_0$ TX represents lateral inclination of the carrier, its turning about a turned axis $x_0$ (axis $x_{0'}$)

ST represents turning angle of the upper carriage about axis $z_1$

SX represents longitudinal inclination of the upper carriage in relation to the horizontal plane SY represents lateral tilting of the upper carriage in relation to the horizontal plane.

Figure 3A:
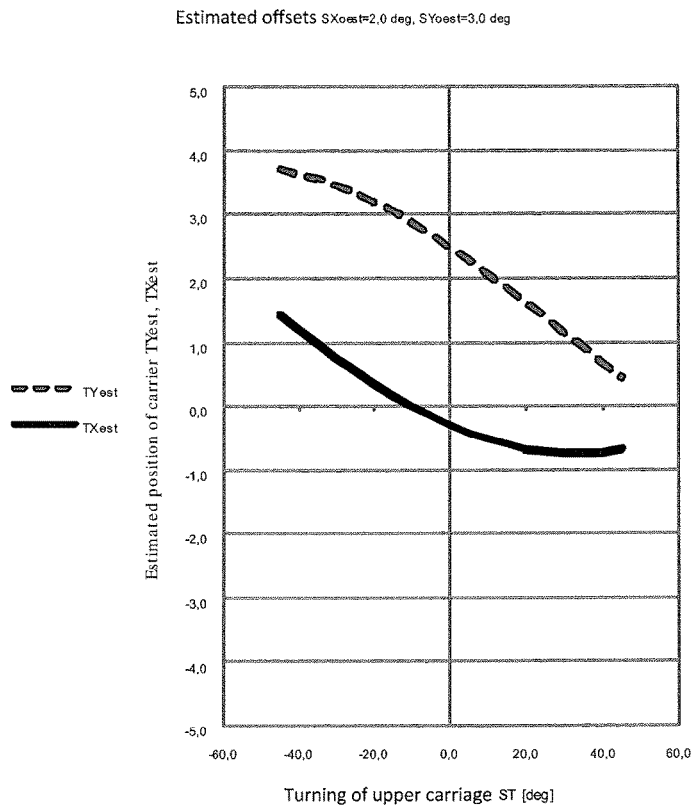
FIGS. 3a and 3b are schematic views of results obtained by the calibration of sensors.
Figure 3B:
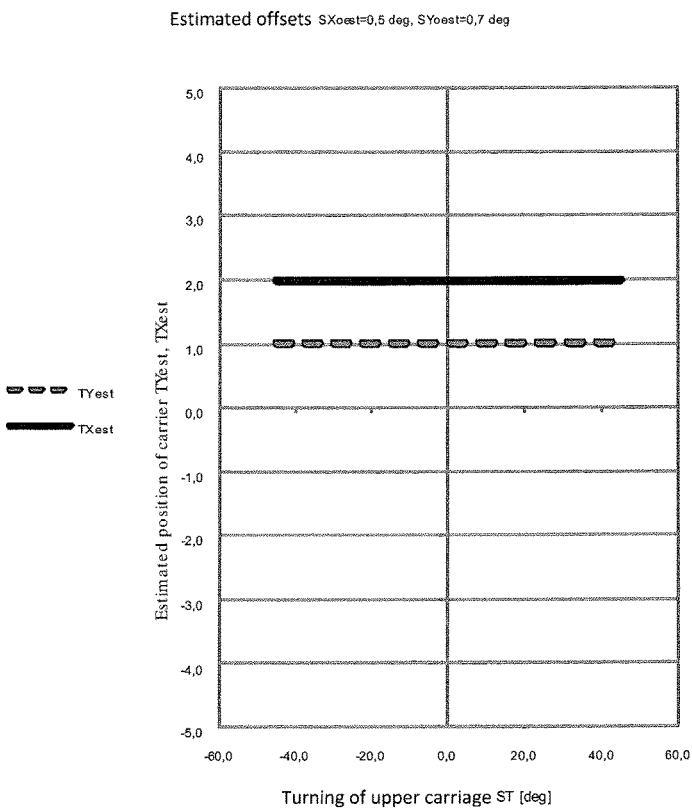

FIGS. 3a and 3b are schematic views of inclinations in the directions of longitudinal and transverse axes x and y of the drilling equipment, formed on the basis of expected error values obtained from a calibration of equipment.

If the precision of the inclination sensors was optimal, computation at each measuring point would produce constants TX [i] and TY [i], because the equipment carrier does not move, as stated, anywhere when the upper carriage is turned. However, since the inclination sensors contain zero point offset, i.e. error caused by faulty installation, values TX[i] and TY[i] do not remain constant but vary which makes it look like the carrier tilts when the turning angle of the upper carriage 3 changes.

In accordance with the method, zero point offset values SXoffset and SYoffset are estimated for both inclination sensors of the inclination measurement device 8, carrier inclinations TY and TX being then computed at each measuring point by means of these zero point offsets.

$$TY[i]=f(SX[i]-SX\text{offset},SY[i]-SY\text{offset},ST[i]) \quad (3)$$

$$TX[i]=f(SX[i]-SX\text{offset},SY[i]-SY\text{offset},TY[i],ST[i]) \quad (4)$$

SXoffset and SYoffset values of different zero point offsets result in different variations in the carrier inclinations TX[i] and TY[i]. When these values are calculated by means of the best-estimated SXoffset and SYoffset values of zero point offsets, variation in the carrier inclination values can be minimized. This is illustrated in FIG. 3a, which shows changes in inclination values as a function of the turning angle when the SXoffset and SYoffset values of the zero point offsets differ from optimal values.

FIG. 3b, in turn, shows graphs that illustrate how correct SXoffset and SYoffset values of zero point offsets always result in substantially correct carrier inclination values, irrespective of the turning angle.

In practice the SXoffset and SYoffset values of zero point offsets may be calculated by different mathematical methods, for example by using the least squares method to calculate for SXoffset and SYoffset pairs of zero point offset values of turning angles a sum of mean error squares of value series TY[i] and TX[i] corresponding to them. After this, the SXoffset and SYoffset pair of zero point offset values in which the sum of squares of errors is the smallest may be selected. This calculation may be carried out using a calculator 9 which is also used as a positioning device for the equipment orientation.

FIGS. 4a and 4b in turn show how to calibrate the boom assembly of a turning sensor of the upper carriage and the boom assembly attached thereto or, correspondingly, that of the boom assembly alone. The starting point here is that the inclination sensors of the upper carriage have been calibrated in the manner described above. When the drilling equipment is already in place, steadily and immovably, the upper carriage 3, and thereby also the boom assembly 5, is kept in the same position in relation to the drilling equipment and it is not turned in relation to the carrier 1 from this position during the calibration.

When the upper carriage 3 is in this position, the reading of the turn sensor 7 is stored. The upper carriage is then tilted in a longitudinal direction of the drilling equipment about the transverse inclination axis 11 in relation to the carrier 1 at suitable inclination intervals between extreme positions α and β shown in FIGS. 4a and 4b. The extreme position angles α and β may be different or equal in size.

Inclination values measured by the inclination sensors indicating the inclination of x and y axes of the inclination measurement device 8 are measured for each inclination angle.

On the basis of the values thus obtained, the inclination values, the turning angle that remains unchanged and the inclination values provided by the calibrated inclination sensors, zero point offset may be calculated for the turning angle sensor 7 so that the measurement axes of the sensors of the inclination measurement device 8 are, to the best possible extent, at the 0 angle of the turning sensor in relation to the longitudinal axis of the drilling equipment.

Figure 5:
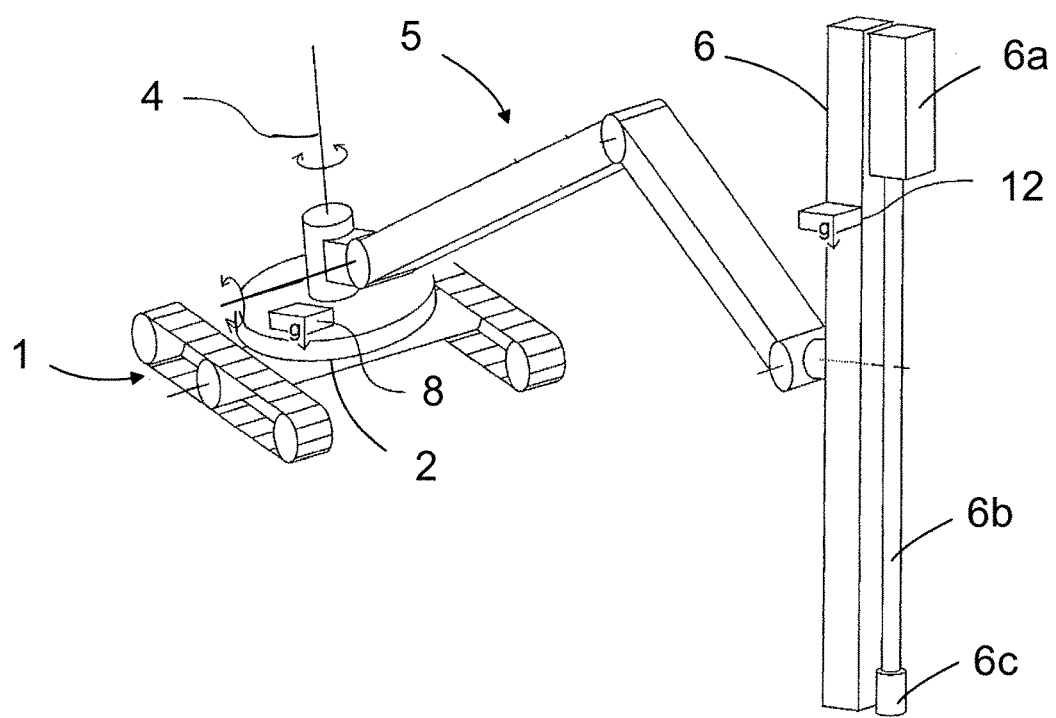
FIG. 5 is a schematic view of another type of drilling equipment.

FIG. 5 is a schematic view of another type of drilling equipment. It shows drilling equipment that corresponds to the one in FIG. 1, except that it does not have an inclination axis between the carrier and the frame, therefore the frame always tilts in the same way as the carrier. Moreover, the drilling equipment of this embodiment does not have a separate upper carriage or cabin for the operator either, although they could be provided, similarly as in the solution of FIG. 1. Likewise, the drilling equipment of FIG. 1 could be without a cabin and a separate upper carriage.

Further, it has an inclination measurement device 8 and the related inclination sensors for measuring frame inclination fixedly installed to the frame so that it does not turn with the boom assembly 5 when it is turned.

According to this embodiment, calibration is carried out by means of inclination sensors of the feed beam inclination measurement device 12 installed to be immovable in relation to the feed beam 6.

During calibration the boom assembly 5 and the feed beam 6 are first set into a position in which they are able to turn about the turning axis 4 without being prevented by any obstacles possibly present around and they are kept in place so that their position in relation to one another does not change, nor do they turn in relation to the frame (2) of the drilling equipment. The feed beam 6 may be installed to an approximately vertical position, for example, although there are no significant requirements of precision regarding the direction as such because deviations in inclination can be taken into account in the computing.

When the boom assembly 5 and the associated feed beams 6 have been installed to a suitable position, the boom assembly is turned about the turning axis 4 to different turning angles and, at the same time, an inclination value provided by the inclination sensors of the feed bean inclination measurement device 12 is measured at each turning angle position.

Also inclination values provided by the inclination sensors of the inclination measurement devices 8 of the frame 2 may be measured during calibration, these values remaining the same irrespective of the turning of the boom assembly because the inclination measurement device 8 does not turn with the boom assembly 5. The readings provided by the inclination sensors of the inclination measurement device 12 of the feed beam 6 allow offset values of the inclination sensors of the frame inclination measurement device 8 to be determined.

The method of the invention can naturally be applied not only to suitable calibration of sensors with the help of a computer program but also to continuous condition-monitoring of sensors, the program allowing sensor calibration to be carried out automatically even.

The figures and the specification disclose only an exemplary equipment in which the method may be used. The rolls in the carrier may be replaced by wheels on which the drilling equipment moves. The upper carriage may comprise an engine and other actuators with control cabins, if any, and a drilling boom, together with its accessories, attached thereto and turning with it. Alternatively, the engine and the other actuators may be attached to the frame, the drilling boom with its accessories being only attached to the upper carriage.

The invention claimed is:

1. An arrangement for calibrating sensors in a drilling equipment comprising:
   a movable carrier;
   a frame;
   a boom assembly mounted to turn about a turning axis vertical to the frame;
   an angle sensor for measuring a turning angle of the boom assembly in relation to the frame;
   gravity-based inclination sensors mounted to the boom assembly and rotating with the boom assembly about the turning axis for measuring inclination in the direction of two co-ordinate axes that are perpendicular to each other;
   inclination sensors mounted to the frame, which remain stationary with the frame during turning of the boom assembly; and
   a control unit arranged, when turning the boom assembly about the turning axis to a plural number of different turning angle positions in relation to the frame, to measure the value of the turning angle and the inclination values provided by the gravity-based inclination sensors for each turning angle position and calculate, on the basis of the measured turning angle value and the inclination values provided by the gravity-based inclination sensors, deviations of the values provided by the inclination sensors from the actual inclination angle, and to measure, during calibration, inclination values of inclination sensors mounted to the frame and remaining stationary with the frame during the turning of the boom assembly to measure the inclination of the frame, and to calculate by means of the gravity-based inclination sensors of the boom assembly, deviations of the inclination sensors mounted to the frame to measure the inclination of the frame.

2. An arrangement as claimed in claim 1, wherein the gravity-based inclination sensors used in calibration are sensors mounted to the turning axis end of the boom assembly to measure the inclination of the frame, and mounted to the boom assembly so as to turn about the turning axis with the boom assembly when the boom assembly is turned, whereas otherwise staying in the same position in relation to the turning axis irrespective of the boom assembly movements.

3. An arrangement as claimed in claim 2, wherein the control unit is arranged to calculate the values of deviation of the gravity-based inclination sensors by using the measured angle values and by applying the least squares method.

4. An arrangement as claimed in claim 2, wherein the control unit is arranged for calibrating, after the calibration of the inclination sensors, a turning sensor of the turning axis, the boom assembly being kept in the same position in relation to the drilling arrangement and non-turnable in place in relation to the drilling arrangement frame, to read the value of the turning angle of the turning sensor, when tilting the frame to different inclination angles in relation to the carrier about a transverse axis between them, to measure the inclination values of the gravity-based inclination sensors of the inclination measuring device and to calculate on the basis of the measured values of the turning angle and the inclination angles the turning angle deviation provided by the turning sensor from the actual turning angle value.

5. An arrangement as claimed in claim 1, wherein the gravity-based inclination sensors used in the calibration are sensors mounted to a feed beam provided at the end of the boom assembly to measure the inclination of the feed beam and when the boom assembly and the feed beam are kept in the same position in relation to one another throughout the calibration, the gravity-based inclination sensors turn about the turning axis with the boom assembly as the boom assembly is turned, whereas otherwise staying in the same position in relation to the turning axis.

6. An arrangement as claimed in claim 5, wherein the control unit is arranged to calculate the values of deviation of the gravity-based inclination sensors by using the measured angle values and by applying the least squares method.

* * * * *